(12) United States Patent
Imai et al.

(10) Patent No.: US 10,500,691 B2
(45) Date of Patent: Dec. 10, 2019

(54) SUBSTRATE PROCESSING APPARATUS AND SUBSTRATE PROCESSING METHOD

(71) Applicant: EBARA CORPORATION, Tokyo (JP)

(72) Inventors: Masayoshi Imai, Tokyo (JP); Katsuhiko Tokushige, Tokyo (JP); Suguru Ogura, Tokyo (JP); Katsuhide Watanabe, Tokyo (JP); Junji Kunisawa, Tokyo (JP); Takeshi Iizumi, Tokyo (JP); Mitsuru Miyazaki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 172 days.

(21) Appl. No.: 15/688,281

(22) Filed: Aug. 28, 2017

(65) Prior Publication Data

US 2018/0056470 A1    Mar. 1, 2018

(30) Foreign Application Priority Data

Aug. 29, 2016 (JP) .................................. 2016-166851
Jul. 24, 2017 (JP) .................................. 2017-142408

(51) Int. Cl.
| | | |
|---|---|---|
| *B24B 5/35* | (2006.01) |
| *B08B 3/02* | (2006.01) |
| *B08B 3/08* | (2006.01) |
| *B08B 3/10* | (2006.01) |
| *B24B 57/02* | (2006.01) |
| *C01B 15/01* | (2006.01) |
| *C11D 7/34* | (2006.01) |
| *C11D 11/00* | (2006.01) |

(52) U.S. Cl.
CPC ............... *B24B 5/35* (2013.01); *B08B 3/024* (2013.01); *B08B 3/08* (2013.01); *B08B 3/10* (2013.01); *B24B 57/02* (2013.01); *C01B 15/01* (2013.01); *C11D 7/34* (2013.01); *C11D 11/0064* (2013.01)

(58) Field of Classification Search
CPC ....... B24B 5/35; B24B 57/02; B24B 27/0096; B08B 3/02; B08B 3/024; B08B 3/10; H01L 21/02041; H01L 21/02043; H01L 21/02052; H01L 21/02054; H01L 21/02057; H01L 21/6704; H01L 21/67051; H01L 21/67057; H01L 21/67155; H01L 21/67161; H01L 21/67219
USPC .............................................. 451/66, 67, 57
See application file for complete search history.

(56) References Cited

U.S. PATENT DOCUMENTS 5,830,045 A * 11/1998 Togawa .................. B24B 37/04
451/288
5,888,124 A * 3/1999 Lin ........................... B08B 1/00
134/184

(Continued)

FOREIGN PATENT DOCUMENTS

| JP | 3725809 B2 | 12/2005 |
| JP | 2008-14183 A | 5/2008 |

*Primary Examiner* — George B Nguyen
(74) *Attorney, Agent, or Firm* — Baker & Hostetler LLP

(57) ABSTRACT

A substrate processing apparatus includes a polisher configured to polish a substrate using a polishing liquid, a first cleaner configured to clean the substrate polished by the polisher using sulfuric acid and hydrogen peroxide water, a second cleaner configured to clean the substrate cleaned by the first cleaner using a basic chemical liquid and hydrogen peroxide water, and a drier configured to dry the substrate cleaned by the second cleaner.

18 Claims, 12 Drawing Sheets

(56) References Cited

U.S. PATENT DOCUMENTS

| | | | | |
|---|---|---|---|---|
| 6,012,966 A * | 1/2000 | Ban | B24B 37/04 | 451/287 |
| 6,139,406 A * | 10/2000 | Kennedy | B24B 37/04 | 451/28 |
| 6,293,855 B1 * | 9/2001 | Yoshida | B24B 37/04 | 451/67 |
| 6,316,364 B1 * | 11/2001 | Kubo | H01L 21/3212 | 257/E21.304 |
| 6,376,009 B1 * | 4/2002 | Bergvall | B05D 5/063 | 40/612 |
| 6,638,145 B2 * | 10/2003 | Hall | B24B 37/0056 | 134/3 |
| 6,818,066 B2 * | 11/2004 | Cheung | H01L 21/288 | 118/715 |
| 6,957,511 B1 * | 10/2005 | Leigh | B23H 5/08 | 451/36 |
| 6,960,117 B1 * | 11/2005 | Mahadev | B23K 26/146 | 451/37 |
| 7,204,743 B2 * | 4/2007 | Basol | B23H 5/08 | 451/288 |
| 8,551,253 B2 * | 10/2013 | Na'im | B08B 1/04 | 134/1 |
| 2003/0083000 A1 * | 5/2003 | Sambuco, Jr. | B24B 1/00 | 451/49 |
| 2005/0075056 A1 * | 4/2005 | Wu | B24B 37/042 | 451/57 |
| 2008/0198341 A1 * | 8/2008 | Fukutomi | H01L 21/67051 | 355/27 |
| 2009/0000649 A1 * | 1/2009 | Lee | C11D 3/3947 | 134/28 |
| 2010/0099258 A1 * | 4/2010 | Hoh | H01L 21/02063 | 438/689 |
| 2010/0154826 A1 * | 6/2010 | Printz | H01L 21/67028 | 134/18 |
| 2012/0111361 A1 * | 5/2012 | Treichel | B08B 1/02 | 134/6 |
| 2014/0242885 A1 * | 8/2014 | Nakao | B24B 37/345 | 451/57 |

* cited by examiner

FIG.4

NUMBER OF DEFECT

|  | W1 | W3 (SPM→APM) | W4 (APM) |
|---|---|---|---|
| AFTER BEING POLISHED | 8,036 | 10,034 | 9,065 |
| AFTER BEING PROCESSED | – | 2,543 | 8,533 |

SUBSTRATE PROCESSING APPARATUS AND SUBSTRATE PROCESSING METHOD

CROSS-REFERENCE TO RELATED APPLICATIONS

This application claims the benefit of Japanese Priority Patent Application JP 2016-166851 filed on Aug. 29, 2016 and JP 2017-142408 filed on Jul. 24, 2017, the entire contents of which are incorporated herein by reference.

FIELD

The present technology relates to a substrate processing apparatus and a substrate processing method.

BACKGROUND

A substrate processing apparatus such as a chemical mechanical polishing (CMP) apparatus polishes a substrate using slurry and then cleans the substrate. However, in accordance with recent technological advances, in the cleaning process by a cleaning device installed within the substrate processing apparatus, a removal rate of foreign body from the substrate, in other words, effectiveness of such cleaning process is not necessarily sufficient, such that the substrate is cleaned using a substrate cleaning apparatus separate from the substrate processing apparatus.

It is desired to provide a substrate processing apparatus and a substrate processing method that can sufficiently clean the substrate after being polished, with a small number of processes. Furthermore, there is room for further improvement in cleaning effectiveness of conventional cleaning devices, even applicable to most advanced processes.

SUMMARY

According to one embodiment, provided is a substrate processing apparatus including: a polisher configured to polish a substrate using polishing liquid; a first cleaner configured to clean, using sulfuric acid and hydrogen peroxide water, the substrate polished by the polisher; a second cleaner configured to clean, using a basic chemical liquid and hydrogen peroxide water, the substrate cleaned by the first cleaner; and a drier configured to dry the substrate cleaned by the second cleaner.

According to another embodiment, provided is a substrate processing method including: providing a substrate processing apparatus, the substrate processing apparatus comprising a polisher, first cleaner, a second cleaner and a dryer; polishing a substrate using a polishing liquid by the polisher in the substrate processing apparatus; after that, cleaning the substrate using sulfuric acid and hydrogen peroxide water by the first cleaner; after that, cleaning the substrate using a basic chemical liquid and hydrogen peroxide water by the second cleaner; and after that, drying the substrate by the drier.

According to another embodiment, provided is a substrate processing method including: in a first cleaning process, cleaning, using sulfuric acid and hydrogen peroxide water, a substrate to which cerium ions are attached; after that, in a second cleaning process, cleaning the substrate using a basic chemical liquid and hydrogen peroxide water; and after that, in a drying process, drying the substrate.

A substrate after being polished can be sufficiently cleaned with a small number of processes. In addition, a total processing time can be shortened.

In addition, since a substrate polished using a cerium oxide is not taken out from a polishing apparatus and then cleaned by a separately disposed cleaning apparatus, but can be cleaned in the same polishing apparatus without being finally dried, a risk that water marks will be generated due to drying of the substrate in a cleaning process can be suppressed, and the substrate is polished using the cerium oxide and at the same time, the substrate after being polished to which the cerium oxide is attached is cleaned, such that the cerium oxide can be more reliably removed.

Further, it was found by a study of the present inventors that a cerium abrasive grain has a strong electrical attractive force to the substrate, such that the cerium oxide attached to the substrate cannot be removed by only cleaning using a cleaning solution including an alkaline chemical liquid or a surfactant. According to the present disclosure, the cerium oxide can be more reliably removed from the substrate.

BRIEF DESCRIPTION OF DRAWINGS

FIG. 4 is a table showing the number of defects in substrates W1, W3, and W4 after being polished and after being processed;

DETAILED DESCRIPTION OF NON-LIMITING EXAMPLE EMBODIMENTS

Figure 1:
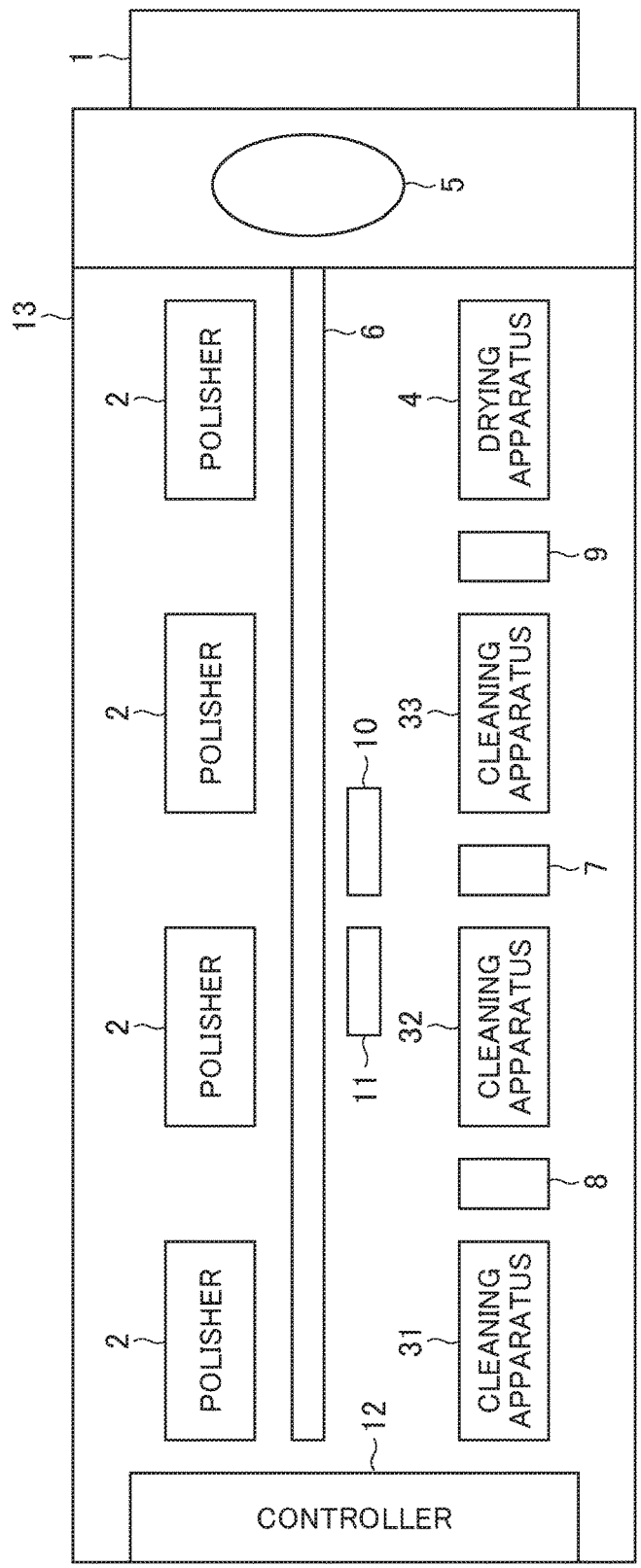
FIG. 1 is a view showing an example of a schematic configuration of a substrate processing apparatus.

Hereinafter, embodiments will be described. It should be noted that embodiments to be described below are an example of the case of executing the present invention and the present invention is riot limited to a detailed configuration to be described below. In execution of the present invention, a detailed configuration depending on an embodiment may be appropriately adopted.

According to one embodiment of the present discloser, a substrate processing apparatus including: a polisher configured to polish a substrate using polishing liquid; a first cleaner configured to clean, using sulfuric acid and hydrogen peroxide water, the substrate polished by the polisher; a second cleaner configured to clean, using a basic chemical liquid and hydrogen peroxide water, the substrate cleaned by the first cleaner; and a drier configured to dry the substrate cleaned by the second cleaner.

The first cleaner and the second cleaner are installed in the substrate processing apparatus. The polishing liquid can be removed by cleaning by the first cleaner using the sulfuric acid and the hydrogen peroxide water. A component caused by the sulfuric acid used in the first cleaner can be removed by cleaning by the second cleaner using the basic chemical liquid and the hydrogen peroxide water. Therefore, the substrate after being polished can be sufficiently cleaned with a small number of processes.

Preferably, the substrate processing apparatus does not have a mechanism configured to dry the substrate after being polished by the polisher and before being cleaned by the first cleaner.

Preferably, the substrate processing apparatus further includes a transporter configured to transport the substrate polished by the polisher to the first cleaner without drying the substrate.

More preferably, the substrate processing apparatus further includes a first liquid supply mechanism configured to shower liquid on the substrate that is being transported by the transporter.

Preferably, the substrate processing apparatus further includes a substrate station on which the substrate after being polished by the polisher and before being cleaned by the first cleaner is mounted; and a second liquid supply mechanism configured to shower liquid on the substrate mounted on the substrate station.

The substrate after being polished is not dried, such that residues on the substrate can be efficiently removed at the time of cleaning the substrate by the first cleaner.

Preferably, the first cleaner is housed in a first housing provided with a first shutter that is openable and closable, the second cleaner is housed in a second housing provided with a second shutter that is openable and closable, and the drier is housed in a third housing provided with a third shutter that is openable and closable.

Therefore, it is possible to suppress the sulfuric acid or the hydrogen peroxide water used in the first cleaner from entering the second cleaner and the drier, and it is possible to suppress the basic chemical liquid or the hydrogen peroxide water used in the second cleaner from entering the first cleaner or the drier.

Preferably, the substrate processing apparatus further includes a third cleaner configured to clean, using a basic chemical liquid and hydrogen peroxide water, the substrate polished by the polisher, wherein the first cleaner cleans the substrate cleaned by the third cleaner.

Preferably, the third cleaner cleans the substrate by bringing a cleaning member into contact with the substrate while supplying basic chemical liquid and hydrogen peroxide water to the substrate.

Preferably, the second cleaner performs two-fluid let cleaning after cleaning the substrate using the basic chemical liquid and the hydrogen peroxide water.

Cleaning power is improved by these configurations.

Preferably, the polisher polishes the substrate using the polishing liquid including a cerium oxide.

Residuals of the cerium oxide can be reduced by cleaning by the first cleaner.

According to one embodiment of the present discloser, provided is a substrate processing method including: providing a substrate processing apparatus, the substrate processing apparatus comprising a polisher, first cleaner, a second cleaner and a dryer; polishing a substrate using a polishing liquid by the polisher in the substrate processing apparatus; after that, cleaning the substrate using sulfuric acid and hydrogen peroxide water by the first cleaner; after that, cleaning the substrate using a basic chemical liquid and hydrogen peroxide water by the second cleaner; and after that, drying the substrate by the drier.

The cleaning using the sulfuric acid and the hydrogen peroxide water and the cleaning using the basic chemical liquid and the hydrogen peroxide water are performed by the first cleaner and the second cleaner installed in the substrate processing apparatus. Therefore, the substrate after being polished can be sufficiently cleaned with a small number of processes.

Preferably, the substrate processing method further includes transporting the polished substrate from the polisher to the first cleaner without drying the polished substrate, after polishing the substrate.

The substrate after being polished is not dried, such that residues on the substrate can be efficiently removed at the time of cleaning the substrate by the first cleaner.

According to one embodiment of the present discloser, provided is a substrate processing method including: in a first cleaning process, cleaning, using sulfuric acid and hydrogen peroxide water, a substrate to which cerium ions are attached; after that, in a second cleaning process, cleaning the substrate using a basic chemical liquid and hydrogen peroxide water; and after that, in a drying process, drying the substrate.

The substrate is cleaned using the sulfuric acid and the hydrogen peroxide water, such that the cerium ions can be removed. Then, the substrate is cleaned using the basic chemical liquid and the hydrogen peroxide water, such that the sulfuric acid can be removed.

Preferably, in the first cleaning process, the substrate to which the cerium ions having a cerium concentration of $1.0 \times 10^{10}$ atms/cm$^2$ or more are attached is cleaned, and a cerium concentration of the substrate subjected to the drying process is a detection limit or less in measurement by an inductively coupled plasma mass spectrometry (ICP-MS) method.

In the first cleaning process and/or the second cleaning process, the substrate may be heated.

Preferably, the substrate processing method further includes at least one of: supplying the basic chemical liquid and the hydrogen peroxide water to the substrate to which the cerium ions are attached; bringing a rotating sponge member into contact with the substrate to which the cerium ions are attached; and supplying a jet stream of a gas and a liquid to the substrate to which the cerium ions are attached, before the first cleaning process.

Such a rough cleaning is performed, such that cleaning power in a series of substrate cleaning processes is improved.

Preferably, the first cleaning process, the second cleaning process, and the drying process are performed in the cleaning tank, the method further includes: cleaning an inner portion of a cleaning tank between the first cleaning process and the second cleaning process; and cleaning the inner portion of the cleaning tank between the second cleaning process and the drying process.

Therefore, it is possible to suppress a reaction of a chemical liquid (particularly, the sulfuric acid and the basic chemical liquid).

Preferably, the substrate processing method further includes polishing the substrate using slurry including the cerium ions before the first cleaning process, wherein the substrate after being polished is not dried between the polishing process and the first cleaning process.

The substrate after being polished is not dried, such that a risk that a water mark will be generated and a risk that a cerium oxide will be fixed to a wafer can be suppressed, and the cerium oxide can be more reliably removed from the substrate.

FIG. 1 is a view showing an example of a schematic configuration of a substrate processing apparatus, and may be considered as a schematic top view of the substrate processing apparatus. The substrate processing apparatus includes a load port 1, one or a plurality of polishers 2, a plurality of cleaning apparatuses 31 to 33, one or a plurality of drying apparatuses 4, transporters 5 to 9, substrate stations 10 and 11, and a controller 12. Each portion except for the load port 1 can be housed in an apparatus 13.

The load port 1 is disposed adjacently to a short side of the apparatus 13, and a substrate cassette stocking substrates such as semiconductor wafers is mounted in the load port 1.

The polishers 2 are disposed in parallel with one another along a long side of the apparatus 13, and polish the substrates using slurry including, for example, a cerium oxide ($CeO_2$). The slurry can remain on the substrates after being polished. Although it is assumed that the polishers 2 polish surfaces of the substrates, the polishers 2 may polish bevels of the substrates.

Here, an average particle diameter ($D_{50}$) of the cerium oxide in the slurry (an abrasive) is generally 0.5 to 1.5 μm. In addition, a content of cerium oxide is 1 to 10 mass % based on the total amount of abrasive for a substrate. A cerium oxide abrasive grain has polishing characteristics more excellent than those of a silica abrasive grain according to the related art, but is easily precipitated due to a large specific gravity. An amount of added surfactant, and pH of the abrasive need to be adjusted to be in a range in which polishing characteristics that a polishing rate of a pattern concave portion is sufficiently smaller than that of a convex portion are obtained. For this reason, it is preferable to increase a selection ratio between a polishing rate of a silicon oxide layer and a polishing rate of a silicon nitride layer by allowing a viscosity of the abrasive to be in a range of 1.0 to 1.4 mPa·s and at the same time, allowing pH of the abrasive after the surfactant is added to be 5.5 to 9 at the time of performing polishing in order to realize planarization characteristics having low pattern dependency, in consideration of the fact that the viscosity of the abrasive is increased depending on the amount of added surfactant.

The cleaning apparatuses 31 to 33 are disposed in parallel with one another along a long side of the apparatus 13 opposite to the poll polishers 2, and clean the substrates after being polished. When the substrates after being polished are dried, it is difficult to remove residuals attached to the substrates, and it is thus preferable that the substrate processing apparatus does not include mechanisms drying the substrates after being polished in the polishers 2 and before being cleaned in the cleaning apparatuses 31 to 33. Cleaning by the cleaning apparatuses 31 to 33 will be described below in detail.

The drying apparatus 4 is disposed adjacently to the cleaning apparatus 33, and dries the substrate after being cleaned.

The transporter 5 includes a hand for a substrate before being cleaned and a hand for a substrate after being cleaned, and is disposed between the load port 1, and the polisher 2 adjacent to the load port 1 and the drying apparatus 4, and can access the load port 1, the transporter 6, and the drying apparatus 4. The transporter 5 is, for example, a transport robot, and receives the substrate before being processed from the load port 1 and transfers the received substrate to the transporter 6. In addition, the transporter 5 takes out the dried substrate from the drying apparatus 4.

The transporter 6 is disposed along the polishers 2, and can access the transporter 5, the polishers 2, and the substrate station 10. The transporter 6 receives the substrate from the transporter 5, and loads the received substrate into the polisher 2. In addition, the transporter 6 takes out the polished substrate from the polisher 2, and mounts the taken-out substrate in the substrate station 10 installed between the transporter 6 and the transporter 7.

The transporter 7 is disposed in a region surrounded by the substrate station 10 and the cleaning apparatuses 32 and 33, and can access the substrate stations 10 and 11 and the cleaning apparatuses 32 and 33. The transporter 7 takes out the substrate that is polished and is mounted in the substrate station 10, and mounts the taken-out substrate in the substrate station 11. In addition, the transporter 7 takes out the substrate cleaned by the cleaning apparatus 32, and loads the taken-out substrate into the cleaning apparatus 33.

The transporter 8 is disposed between the cleaning apparatuses 31 and 32, and can access the cleaning apparatuses 31 and 32 and the substrate station 11. The transporter 8 takes out the substrate mounted in the substrate station 11, and loads the taken-out substrate into the cleaning apparatus 31. In addition, the transporter 8 takes out the substrate cleaned by the cleaning apparatus 31, and loads the taken-out substrate into the cleaning apparatus 32. The substrate station 11 is disposed in the vicinity of the cleaning apparatus 32, and a detailed disposition example of the substrate station 11 will be described below. In addition, a pure water supply nozzle (not shown) for supplying pure water to the substrate can be installed in the substrate station 11 so that the substrate is not dried.

The transporter 9 is disposed between the cleaning apparatus 33 and the drying apparatus 4, and can access the cleaning apparatus 33 and the drying apparatus 4. The transporter 9 takes out the substrate cleaned by the cleaning apparatus 33, and loads the taken-out substrate into the drying apparatus 4.

The controller 12 controls the respective portions in the substrate processing apparatus. For example, the controller 12 is a processor, and executes a predetermined program to control operations of the polishers 2, the cleaning apparatuses 31 to 33, the drying apparatus 4, and the transporters 5 to 9.

The substrate is processed as follows by such a substrate processing apparatus. First, the substrate before being processed, mounted in the load port 1 is transferred to the transporter 6 by the transporter 5. The transporter 6 loads the substrate into any one of the poll polishers 2, and the substrate is polished by the polisher 2 into which the substrate is loaded. The substrate after being polished is mounted in the substrate station 10 by the transporter 6.

Then, the transporter 7 transfers the substrate mounted in the substrate station 10 to the transporter 8 through the substrate station 11. The transporter 8 loads the substrate into the cleaning apparatus 31, and the substrate is cleaned by the cleaning apparatus 31. The substrate after being cleaned is loaded into the cleaning apparatus 32 by the transporter 8, and is then cleaned by the cleaning apparatus 32. The substrate after being cleaned is loaded into the cleaning apparatus 33 by the transporter 7, and is then cleaned by the cleaning apparatus 33.

The substrate after being cleaned is loaded into the drying apparatus 4 by the transporter 9, and is then dried by the drying apparatus 4. The substrate after being dried is taken out by the transporter 5.

A waste solution of a cleaning solution is discharged from pipes independent of the respective chambers to the outside, such that atmospheres of other chemical liquids do not come into the chamber.

Figure 2:
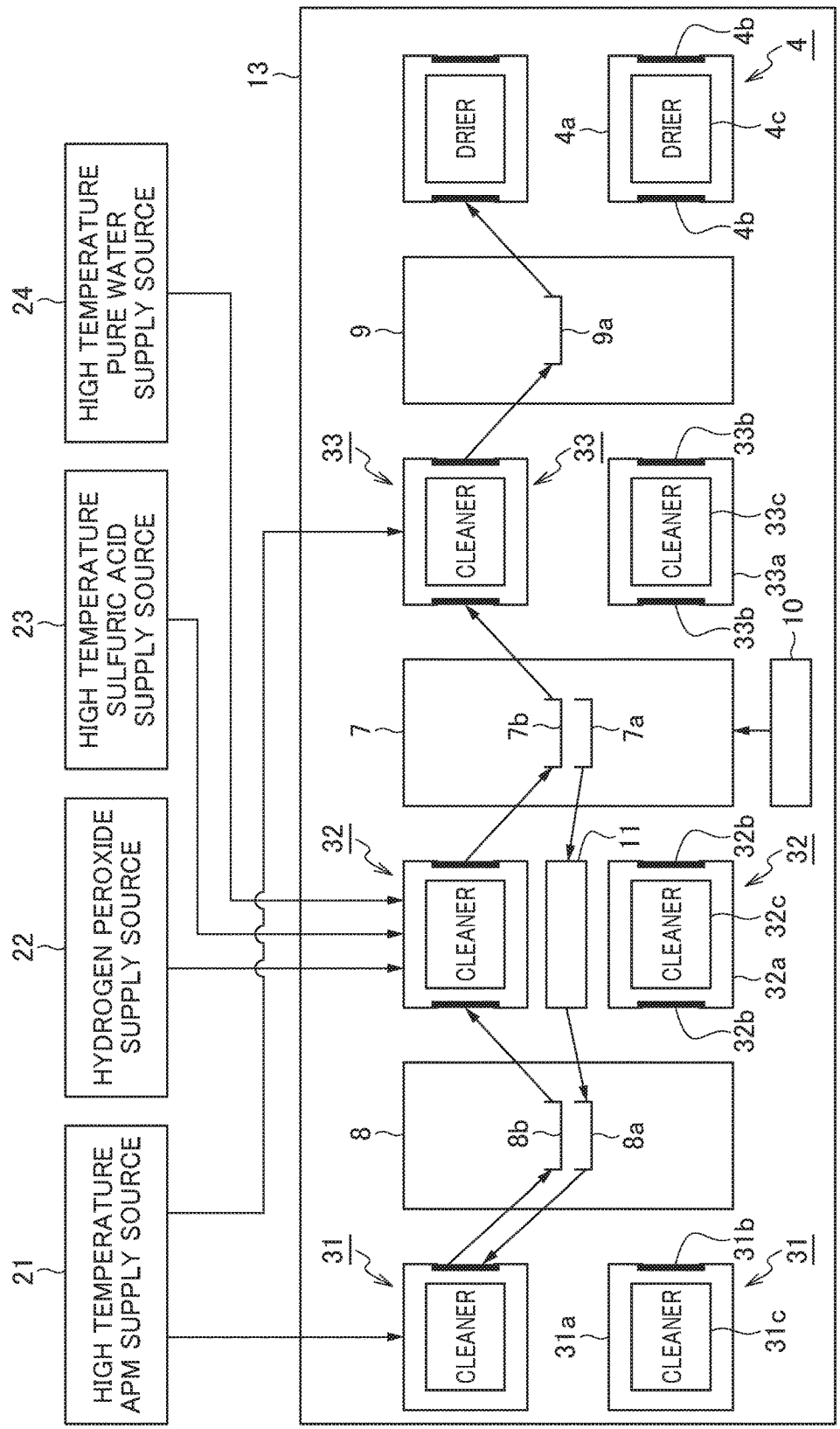
FIG. 2 is a view showing an example of cleaning apparatuses 31 to 34 and related portions thereof in detail.

FIG. 2 is a view showing an example of cleaning apparatuses 31 to 34 and related portions thereof in detail, and maybe considered as a schematic front view of the substrate processing apparatus.

For example, two cleaning apparatuses 31 are disposed in parallel with each other in a vertical direction. The cleaning apparatus 31 has a housing 31a having an opening installed adjacently to the transporter 8, a shutter 31b that can open and close the opening, and a cleaner 31c housed in the housing 31a. The present cleaner 31c performs ammonium hydrogen peroxide mixture (APIA) cleaning as cleaning using a mixed solution of ammonia water and hydrogen peroxide water. The cleaner 31c may supply only the mixed solution to the substrate as the APM cleaning or may perform physical cleaning (scrub cleaning) by bringing a cleaning member such as a roll type sponge into contact with the substrate while supplying the mixed solution to the substrate. It is preferable that the housing 31a has high resistance to the ammonia water or the hydrogen peroxide water. In addition, it is preferable that an independent exhaust mechanism (not shown) is installed in the housing 31a.

For example, two cleaning apparatuses 32 are disposed in parallel with each other in the vertical direction. The cleaning apparatus 32 has a housing 32a having openings each installed adjacently to the transporter 8 and the transporter 7, shutters 32b that can open and close the openings, and a cleaner 32c housed in the housing 32a. The present cleaner 32c performs sulfuric acid and hydrogen peroxide mixture (SPM) cleaning as cleaning using a mixed solution of sulfuric acid and hydrogen peroxide water. It is preferable that the housing 32a has high resistance to the sulfuric acid or the hydrogen peroxide water. In addition, it is preferable that an independent exhaust mechanism (not shown) is installed in the housing 32a. The substrate station 11 may be installed between the two cleaning apparatuses 32.

For example, two cleaning apparatuses 33 are disposed in parallel with each other in the vertical direction. The cleaning apparatus 33 has a housing 33a having openings each installed adjacently to the transporter 7 and the transporter 9, shutters 33b that can open and close the openings, and a cleaner 33c housed in the housing 33a. The present cleaner 33c performs APM cleaning as cleaning using a mixed solution of ammonia water and hydrogen peroxide water. The cleaner 33c may supply only the mixed solution to the substrate as the cleaning or may perform physical cleaning (scrub cleaning) by a cleaning member such as a pen type sponge while supplying the mixed solution to the substrate or may perform two-fluid jet cleaning after the APM cleaning. It is preferable that the housing 33a is formed of a material having high resistance to the ammonia water or the hydrogen peroxide water, for example, polyvinyl chloride (PVC). In addition, it is preferable that an independent exhaust mechanism (not shown) is installed in the housing 33a.

For example, two drying apparatuses 4 are disposed in parallel with each other in the vertical direction. The drying apparatus 4 has a housing 4a having openings each installed adjacently to the transporter 9 and the transporter 5 (see FIG. 1), shutters 4b that can open and close the openings, and a drier 4c housed in the housing 4a. The present drier 4c performs, for example, spin rinse dry (SRD) drying on the substrate. In addition, it is preferable that an independent exhaust mechanism (not shown) is installed in the housing 4a.

The transporter 7 is, for example, a transport robot, and has a lower hand 7a and an upper hand 7b. The lower hand 7a transports a substrate of which a pollution level is relatively high, and the upper hand 7b transports a substrate of which a pollution level is relatively low. In detail, the lower hand 7a. takes out a substrate that is polished by the polisher 2, is mounted in the substrate station 10, and is not cleaned, and mounts the taken-out substrate in the substrate station 11. In addition, the upper hand 7b takes out the substrate cleaned by any one of the cleaning apparatuses 32, and loads the taken-out substrate into any one of the cleaning apparatuses 33.

The transporter 8 is, for example, a transport robot, and has a lower hand 8a and an upper hand 8b. The lower hand 8a transports a substrate of which a pollution level is relatively high, and the upper hand 8b transports a substrate of which a pollution level is relatively low. In detail, the lower hand 8a takes out a substrate that is mounted in the substrate station 11 and is not cleaned, and loads the taken-out substrate into any one of the cleaning apparatuses 31. In addition, the upper hand 8b takes out the substrate cleaned by any one of the cleaning apparatuses 31, and loads the taken-out substrate into any one of the cleaning apparatuses 32.

The transporter 9 is, for example, a transport robot, but may have one hand 9a in order to transport the cleaned substrate. The hand 9a takes out the substrate cleaned by any one of the cleaning apparatuses 33, and loads the taken-out substrate into any one of the drying apparatuses 4.

In addition, a high temperature APM supply source 21, a hydrogen peroxide supply source 22, a high temperature sulfuric acid supply source 23, and a high temperature pure water supply source 24 are installed. The high temperature APM supply source 21, the hydrogen peroxide supply source 22, the high temperature sulfuric acid supply source 23, and the high temperature pure water supply source 24 may exist outside the apparatus 13. The high temperature APM supply source 21 supplies an APM of which a temperature is about room temperature to 80° C. to the cleaning apparatuses 31 and 33. The hydrogen peroxide supply source 22 supplies hydrogen peroxide water of which a temperature is about room temperature to the cleaning apparatus 32. The high temperature sulfuric acid supply source 23 supplies sulfuric acid of which a temperature is about room temperature to 80° C. to the cleaning apparatus 32. The high temperature pure water supply source 24 can supply pure water of which a temperature is about 75 to 95° C. to the cleaning apparatus 32.

Alternatively, an external heat supply source such as an infrared heater is installed in each of the cleaning apparatuses 31 to 33 to maintain inner portions of the cleaning apparatuses 31 to 33 at a high temperature by heat supplied from the external heat supply source, such that the APM, the sulfuric acid, and the pure water can be supplied at a low temperature, for example, about room temperature to 40° C. from the high temperature APM supply source 21, the high temperature sulfuric acid supply source 23, and the high temperature pure water supply source 24 to the cleaning apparatuses 31 to 33, respectively. According to the configuration described above, it is possible to use pipes connected from the respective supply sources to the respective cleaning apparatuses 31 to 33 and members such as pipe joints without securing chemical resistance of the pipes and the members so much, which is advantageous in terms of a configuration of the apparatus.

It should be noted that the substrate processing apparatus shown in FIG. 2 is only an example, and the numbers or positions of cleaning apparatuses 31 to 33 and drying apparatuses 4, and configurations of the transporters 7 to 9 and the substrate stations 10 and 11 may be appropriately designed. In addition, although the cleaners 31c and 33c perform the cleaning using the ammonia water, the cleaners 31c and 33c may perform cleaning using other basic (alkaline) chemical liquids and hydrogen peroxide water.

Figure 3:
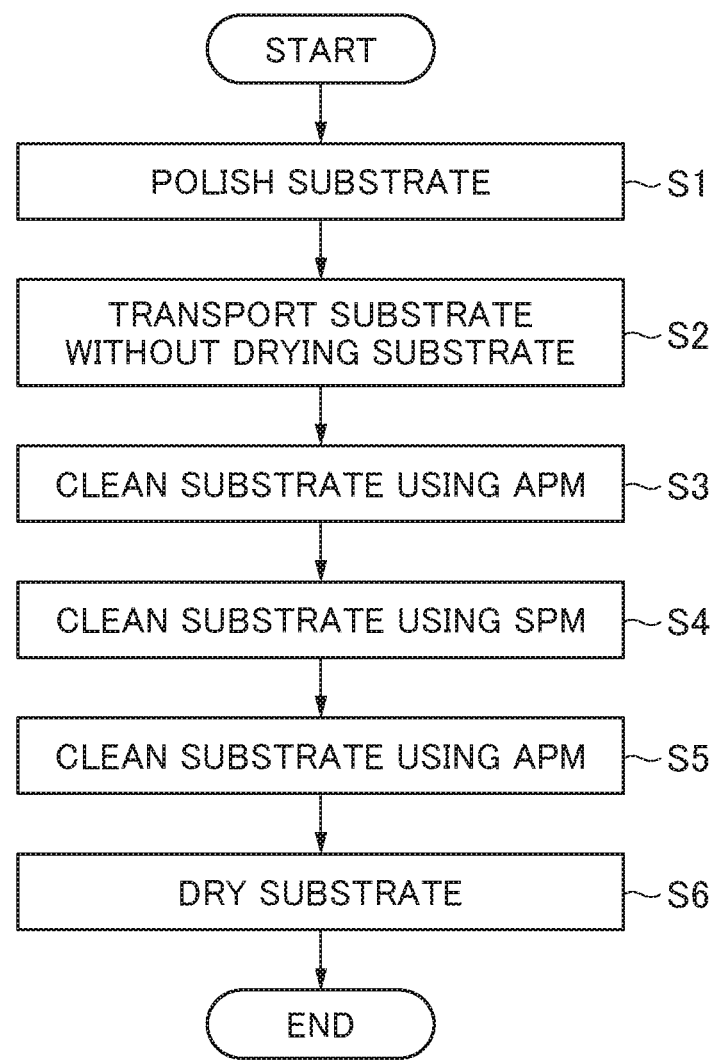
FIG. 3 is a flowchart showing an example of processing operations of the substrate processing apparatus.

FIG. 3 is a flowchart showing an example of processing operations of the substrate processing apparatus. First, the polisher 2 polishes the substrate (step S1). When the slurry including the cerium oxide is used at the time of polishing the substrate, the cerium oxide may remain on the substrate after being polished. In more detail, cerium ions having a cerium concentration of $1.0 \times 10^{10}$ atms/cm$^2$ or more may be attached to a surface and/or a back surface of the substrate, and such a substrate is cleaned.

Then, the transporters 6 to 9 load the substrate after being polished into any one of the cleaning apparatuses 31 without drying the substrate (step S2). In more detail, the transporter 6 takes out the substrate from the polisher 2, and mounts the taken-out substrate in the substrate station 10. Next, the lower hand 7a in the transporter 7 takes out the substrate from the substrate station 10, and mounts the taken-out substrate in the substrate station 11. Next, the lower hand 8a in the transporter 8 takes out the substrate from the substrate station 11, and at the same time, the shutter 31b in the cleaning apparatus 31 is opened, and the substrate is transferred to the cleaner 31c through the opening of the housing 31a. Next, the shutter 31b is closed.

In order to prevent the substrate from being dried, it is preferable to shower a liquid such as pure water on the substrate during the transport of the substrate by the transporters 6 to 8 or in the substrate station 10. In particular, since the substrate stays in the transporters 6 and 7 or the substrate station 10 fora long period of time, it is effective to install a liquid supply mechanism (not shown) showering the liquid on the substrate that is being transported by the transporters 6 and 7 or the substrate in the substrate station 10. On the other hand, in the transporter 8, or the like, in which the substrate stays for a short period of time, such a liquid supply mechanism may not be included.

The cleaning apparatus 31 cleans the substrate by discharging the APM from a spray nozzle (step S3). During this period, the shutter 31b in the cleaning apparatus 31 is closed. Therefore, it is possible to suppress the APM used in the cleaning apparatus 31 from being mixed in other apparatuses, particularly, the cleaning apparatus 32 or the drying apparatus 4. Such an APM cleaning is rough cleaning, and can be omitted in some cases. However, when there are particles that are not removed well, it is possible to process the particles using roll or pencil cleaning or the two-fluid jet.

When the cleaning of the substrate by the cleaning apparatus 31 ends, the transporter 8 transports the substrate from the cleaning apparatus 31 to any one of the cleaning apparatuses 32. In more detail, when the cleaning of the substrate ends, the shutter 31b in the cleaning apparatus 31 is opened, the upper hand 8b in the transporter 8 receives the substrate, and the shutter 31b is then closed. The shutter 32b in the cleaning apparatus 32 adjacent to the transporter 8 is opened, the substrate is transferred to the cleaner 32c through the opening of the housing 32a, and the shutter 32b is then closed.

Then, the cleaning apparatus 32 cleans the substrate by discharging the SPM from a spray nozzle (step S4). In this case, the shutter 32b in the cleaning apparatus 32 is closed. Therefore, it is possible to suppress the SPM used in the cleaning apparatus 32 from being mixed in other apparatuses, particularly, the cleaning apparatuses 31 and 33 or the drying apparatus 4. The residuals such as the particles, the cerium oxide included in the slurry, and an organic material, are dissolved by the SPM cleaning, such that most of the residuals can be removed. In particular, the substrate after being polished is transported so as not to be dried, such that the residuals can be efficiently removed.

It is preferable that the cleaning apparatus 32 cleans the substrate using the pure water after performing the SPM cleaning in order to prevent the sulfuric acid from being leaked from the housing 32a of the cleaning apparatus 32 to the outside. However, even in this case, a sulfur component caused by the sulfuric acid can remain on the substrate after being subjected to the SPM cleaning.

When the cleaning of the substrate by the cleaning apparatus 32 ends, the transporter 7 transports the substrate from the cleaning apparatus 32 to any one of the cleaning apparatuses 33. In more detail, when the cleaning of the substrate ends, the shutter 32b in the cleaning apparatus 32 adjacent to the transporter 7 is opened, the upper hand 7b in the transporter 7 receives the substrate, and the shutter 32b is then closed. The shutter 33b in the cleaning apparatus 33 adjacent to the transporter 7 is opened, the substrate is transferred to the cleaner 33c through the opening of the housing 33a, and the shutter 33b is then closed.

Then, the cleaning apparatus 33 cleans the substrate by discharging the APM from a spray nozzle (step S5). In this case, the shutter 33b in the cleaning apparatus 33 is closed. Therefore, it is possible to suppress the APM used in the cleaning apparatus 33 from being mixed in other apparatuses, particularly, the cleaning apparatus 32 or the drying apparatus 4. Most of the sulfuric components can be removed by the APM cleaning.

When the cleaning of the substrate by the cleaning apparatus 33 ends, the transporter 9 transports the substrate from the cleaning apparatus 33 to any one of the drying apparatuses 4. In more detail, when the cleaning of the substrate ends, the shutter 33b in the cleaning apparatus 33 adjacent to the transporter 9 is opened, the hand 9a in the transporter 9 receives the substrate, and the shutter 33b is then closed. The shutter 4b in the drying apparatus 4 is opened, the substrate is transferred to the drier 4c through the opening of the housing 4a, and the shutter 4b is then closed.

Then, the drying apparatus 4 dries the substrate (step S6). When the drying of the substrate by the drying apparatus 4 ends, the transporter 5 takes out the substrate from the drying apparatus 4. In more detail, when the drying of the substrate ends, the shutter 4b in the drying apparatus 4 adjacent to the transporter 5 is opened, the hand for a substrate after being cleaned in the transporter 5 receives the substrate, and the shutter 4b is then closed.

As described above, in the present embodiment, the SPM cleaning is performed and the APM cleaning is then performed in the substrate processing apparatus, such that the substrate can be efficiently cleaned with a small number of processes and a total processing time can be shortened. That is, the polisher 2 and the cleaning apparatuses 32 and 33 are installed in the substrate processing apparatus, such that the SPM cleaning can be performed on the substrate after being polished without drying the substrate, and the residuals such as the cerium oxide included in the slurry can thus be sufficiently removed. In addition, the APM cleaning is performed after the SPM cleaning, such that the sulfur component caused by the sulfuric acid used in the SPM cleaning can be removed. In addition, the cleaner 32c performing the SPM cleaning is housed in the housing 32a, and the cleaners 31c and 33c performing the APM cleaning are housed in the housings 31a and 33a, respectively, such that atmospheres among the cleaners 31c to 33c can be independent of one another, and, for example, the sulfur component of the SPM thus hardly moves to other processing chambers.

[Experiment 1]

In order to confirm that it is effective to perform the APM cleaning after the SPM cleaning, the following processing was performed on four substrates W1 to W4.

(1) Substrate W1

A surface of the substrate W1 was polished at a pressure of about 70 hPa for 60 seconds using slurry including a cerium oxide. Then, physical cleaning was performed on the substrate W1 for 60 seconds using a roll type sponge while supplying pure water. As described above, neither SPM cleaning nor APM cleaning was performed on the substrate W1 after being polished.

(2) Substrate W2

After the same processing as that of the above (1) was performed, the substrate W2 was cleaned by supplying a mixed solution of sulfuric acid (concentration of 96% and high temperature) and hydrogen peroxide water (concentration of 30% and room temperature) for 60 seconds while rotating the substrate W2. As described above, only the SPM cleaning was performed on the substrate W2 after being polished.

(3) Substrate W3

After the same processing as that of the above (2) was performed, the substrate W3 was cleaned by supplying a mixture of ammonia water, hydrogen peroxide water, and pure water for 30 seconds while rotating the substrate W3. As described above, the SPM cleaning and the APM cleaning were sequentially performed on the substrate W3 after being polished.

(4) Substrate W4

After the same processing as that of the above (1) was performed, the substrate W4 was cleaned by supplying a mixture of ammonia water, hydrogen peroxide water, and pure water for 60 seconds while rotating the substrate W4. As described above, only the APM cleaning was performed on the substrate W4 after being polished.

FIG. 4 is a table showing the number of defects in substrates W1, W3, and W4 after being polished and after being processed. As shown in FIG. 4, about 8,000 to 10,000 defects existed in the substrates W1, W3, and W4 after being polished. In the substrate W4 on which only the APM cleaning was performed, the number of defects in the substrate W4 after being processed was 8,500, and the defects were reduced by only about 6%. On the other hand, in the substrate W3 on which the SPM cleaning and the APM cleaning were performed, the number of defects in the substrate W3 after being processed was about 2,500, and the defects could be reduced by about 75%.

Figure 5A:
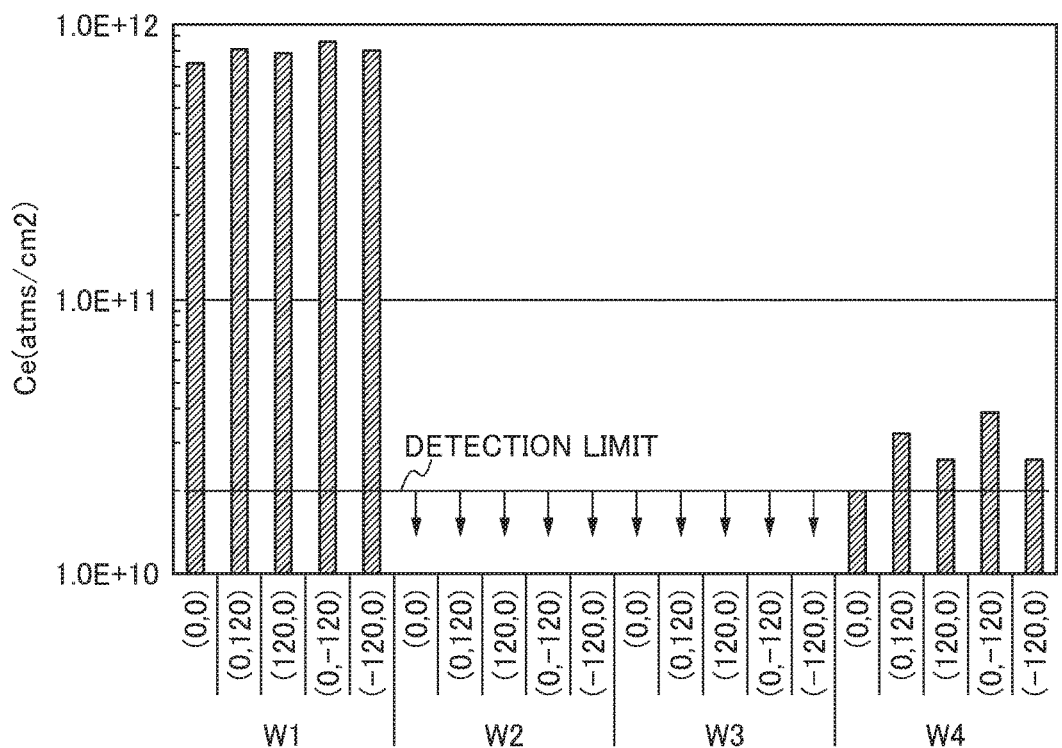
FIG. 5A is a table showing cerium on concentrations [atms/cm$^2$] in substrates W1 to W4 after being polished and after being processed.

FIG. 5A is a table showing cerium ion concentrations [atms/cm$^2$] in substrates W1 to W4 after being polished and after being processed. FIG. 5A shows measurement results of five points of coordinates (0, 0), (0, 120), (120, 0), (0, −120), and (−120, 0) in each of the substrates W1 to W4 by a total reflection X-ray fluorescence (TXRF) method.

A cerium ion concentration in the substrate W1 after being polished was about $8*10^{11}$ [atms/cm$^2$]. A cerium ion concentration in the substrate W4 on which only the APM cleaning was performed was about $3*10^{10}$ [atms/cm$^2$], but cerium ion concentrations in the substrates W2 and W3 on which the SPM cleaning was performed could be reduced up to a detection limit ($2*10^{10}$ [atms/cm$^2$]) or less.

Figure 5B:
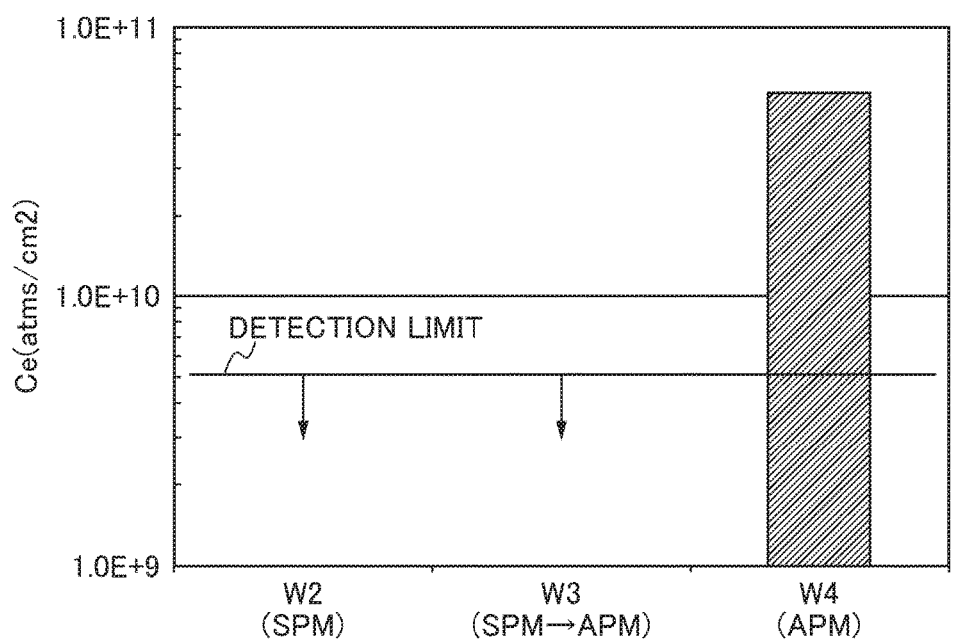
FIG. 5B is a table showing cerium ion concentrations [atms/cm$^2$] in substrates W2 to W4 after being processed.

FIG. 5B is a table showing cerium ion concentrations [atms/cm$^2$] in substrates W2 to W4 after being processed. FIG. 5B shows measurement results by an inductively coupled plasma Mass spectrometry (ICP-MS) method. Also in measurement by the ICP-MS method, a cerium ion concentration in the substrate W4 on which only the APM cleaning was performed was about $5.7*10^{10}$ [atms/cm$^2$], but cerium ion concentrations in the substrates W2 and W3 on which the SPM cleaning was performed could be reduced up to a detection limit ($5*10^9$ [atms/cm$^2$]) or less.

As described above, it can be seen that the SPM cleaning is effective in removing cerium ions.

Figure 6:
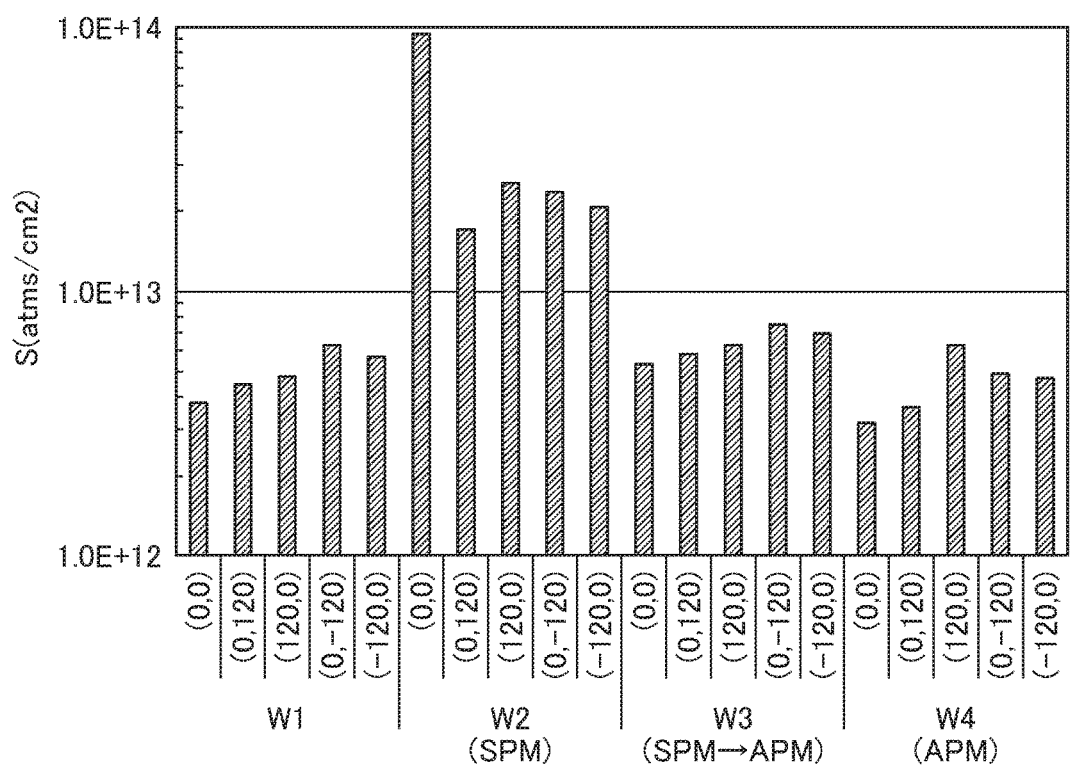
FIG. 6 is a table showing sulfur ion concentrations [atms/cm$^2$] in substrates W1 to W4 after being polished and after being processed.

FIG. 6 is a table showing sulfur ion concentrations [atms/cm$^2$] in substrates W1 to W4 after being polished and after being processed. FIG. 6 shows measurement results of five points of coordinates (0, 0), (0, 120), (120, 0), (0, −120), and (−120, 0) in each of the substrates W1 to W4 by a total reflection X-ray fluorescence (TXRF) method.

A sulfur ion concentration in the substrate W1 after being polished was about $5.0*10^{12}$ [atms/cm$^2$], but a sulfur ion concentration in the substrate W2 on which only the SPM cleaning was performed increased up to $3.6*10^{13}$ [atms/cm$^2$]. It is considered that sulfur ions caused by the sulfuric acid used in the SPM cleaning remains on the substrate W2 from the fact that a sulfur ion concentration in the substrate W4 on which only the SPM cleaning was not performed was about $4.6*10^{12}$ [atms/cm$^2$]. A sulfur ion concentration in the substrate W3 on which the SPM cleaning and the APM cleaning were sequentially performed could be reduced to about $6.4*10^{12}$ [atms/cm$^2$].

As described above, it can be seen that the APM cleaning is effective in removing the sulfur ions caused by the SPM cleaning.

Hereinabove, it could be confirmed that the cerium ions included in the slurry can be removed by the SPM cleaning and the sulfur ions by SPM cleaning can be removed by the APM cleaning.

In the above (2), it could be confirmed from a separate experiment that in cleaning using only sulfuric acid instead of the SPM cleaning, the number of defects is not reduced so much. In addition, in the above (2), it could be confirmed from a separate experiment that a large difference does not exist between a case of supplying the mixture of ammonia water, hydrogen peroxide water, and pure water for 30 seconds and a case of supplying the mixture of ammonia water, hydrogen peroxide water, and pure water for 60 seconds.

[Experiment 2]

In order to confirm that it is more effective to perform the APM cleaning and then perform the SPM cleaning and the APM cleaning, the following processing was performed on three substrates W11 to W13.

(1) Substrate W11

A surface of the substrate W11 was polished at an average pressure of about 70 hPa for 60 seconds using slurry including a cerium oxide. Then, physical cleaning was performed on the substrate W11 for 60 seconds using a roll type sponge while supplying a mixture of ammonia water, hydrogen peroxide water, and pure water. As described above, only the APM cleaning was performed on the substrate W11 after being polished.

(2) Substrate W12

A surface of the substrate W12 was polished at a pressure of about 70 hPa for 60 seconds using slurry including a cerium oxide. Then, the substrate 12 was cleaned by supplying a mixed solution of sulfuric acid (concentration of 96% and high temperature) and hydrogen peroxide water (concentration of 30% and room temperature) for 60 seconds while rotating the substrate W12 at 50 rpm. Then, the substrate W12 was cleaned by supplying a mixture of ammonia water, hydrogen peroxide water, and pure water for 60 seconds while rotating the substrate W12. As described above, the SPM cleaning and the APM cleaning were sequentially performed on the substrate W12 after being polished.

(3) Substrate W13

A surface of the substrate W13 was polished at an average pressure of about 70 hPa for 60 seconds using slurry including a cerium oxide. Then, physical cleaning was performed on the substrate W13 for 60 seconds using a roll type sponge while supplying a mixture of ammonia water, hydrogen peroxide water, and pure water. Then, the substrate W13 was cleaned by supplying a mixed solution of sulfuric acid (concentration of 96% and high temperature) and hydrogen peroxide water (concentration of 30% and room temperature) for 60 seconds while rotating the substrate W13. Then, the substrate W13 was cleaned by supplying a mixture of ammonia water, hydrogen peroxide water, and pure water for 60 seconds while rotating the substrate W13. As described above, the APM cleaning, the SPM cleaning, and the APM cleaning were sequentially performed on the substrate W13 after being polished.

Figure 7:
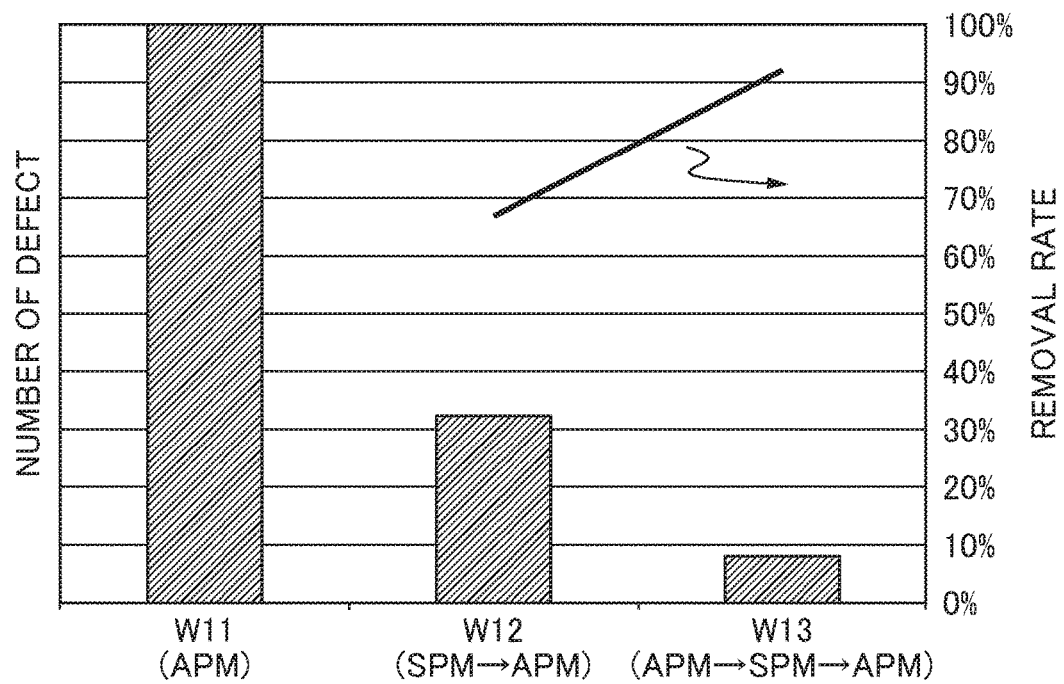
FIG. 7 is a view showing the number of defects (a vertical axis of the left) in a substrate W11 after being processed and substrates W12 and W13 after being processed and removal rates (a vertical axis on the right) based on the substrate W11.

FIG. 7 is a view showing the number of defects (a bar graph, a vertical axis of the left) in substrates W11 to W13 after being processed and removal rates (a solid line, a vertical axis on the right) based on the substrate W11. As shown in the substrate W12 of FIG. 7, defects could be removed by about 67% by performing the SPM cleaning and the APM cleaning after the polishing. On the other hand, as shown in the substrate W13 of FIG. 7, defects could be removed by about 92% by performing the APM cleaning, the SPM cleaning, and the APM cleaning after the polishing, such that a removal rate could be improved.

Hereinabove, it could be confirmed that it is more effective to sequentially perform the APM cleaning, the SPM cleaning, and the APM cleaning.

Figure 8:
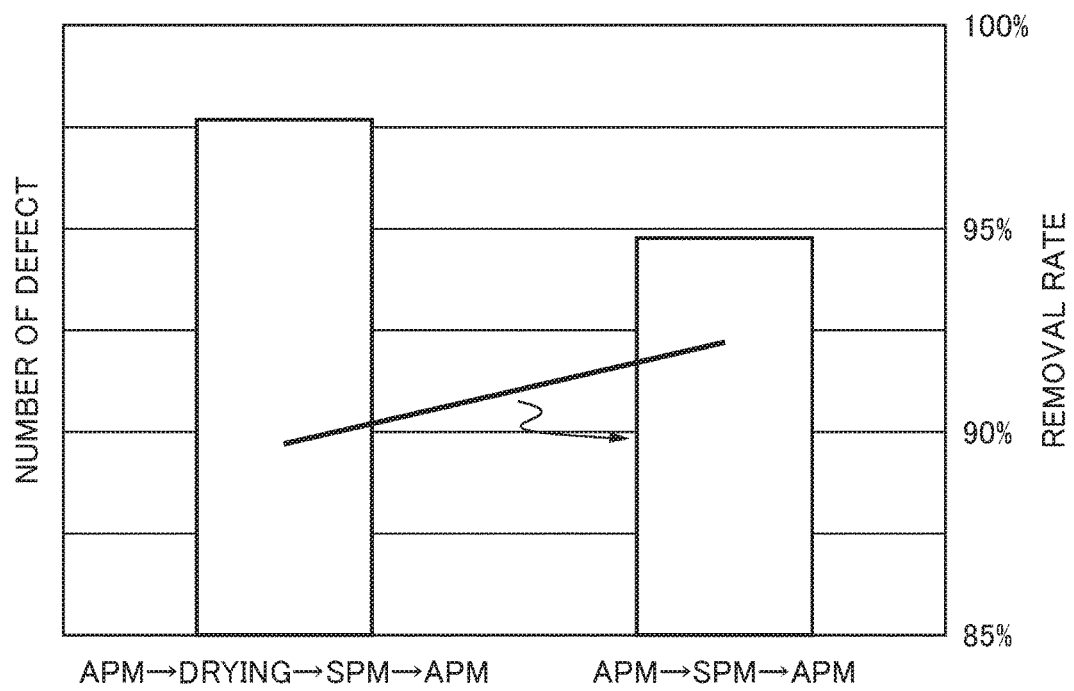
FIG. 8 is a view showing the numbers of defects and removal rates in the case in which drying is performed and in the case in which drying is not performed after first Ammonium hydrogen Peroxide Mixture (APM) cleaning.

FIG. 8 is a view showing the numbers of defects and removal rates in the case in which drying is performed and in the case in which drying is not performed after first APM cleaning. Comparison between (1) the case (a bar graph, a vertical axis of the left) in which cleaning is performed in a sequence of APM cleaning, drying, SPM cleaning, and APM cleaning and (2) the case (a bar graph, a vertical axis of the right) in which cleaning is performed in a sequence of APM cleaning, SPM cleaning, and APM cleaning is shown. It can be seen that the number of defects is smaller and a removal rate is higher in (2) the case in which the cleaning is performed in the sequence of the APM cleaning, the SPM cleaning, and the APM cleaning than in (1) the case in which the cleaning is performed in the sequence of the APM cleaning, the drying, the SPM cleaning, and the APM cleaning. That is, it could be confirmed from FIG. 8 that a cleaning effect is higher in the case in which the drying is not performed, that is, in the case in which the APM cleaning, the SPM cleaning, and the APM cleaning are continuously performed without performing the drying after chemical mechanical polishing (CMP) than in the case in which the drying is performed.

The cerium oxide including cerium has a strong electrical attractive force to the substrate, and it is thus difficult to remove the cerium oxide by only cleaning using a cleaning solution including an alkaline chemical liquid or a surfactant, but cleaning power is improved by the cleaning described above.

Although the cleaning apparatuses 31 and 33 performing the APM cleaning, the cleaning apparatus 32 performing the SPM cleaning, and the drying apparatus 4 are separately installed in the embodiment described above, any two or more of the APM cleaning, the SPM cleaning, and the drying may be performed in one apparatus. The following embodiment shows an example in which the APM cleaning, the SPM cleaning, and the drying are performed in one apparatus.

Figure 9:
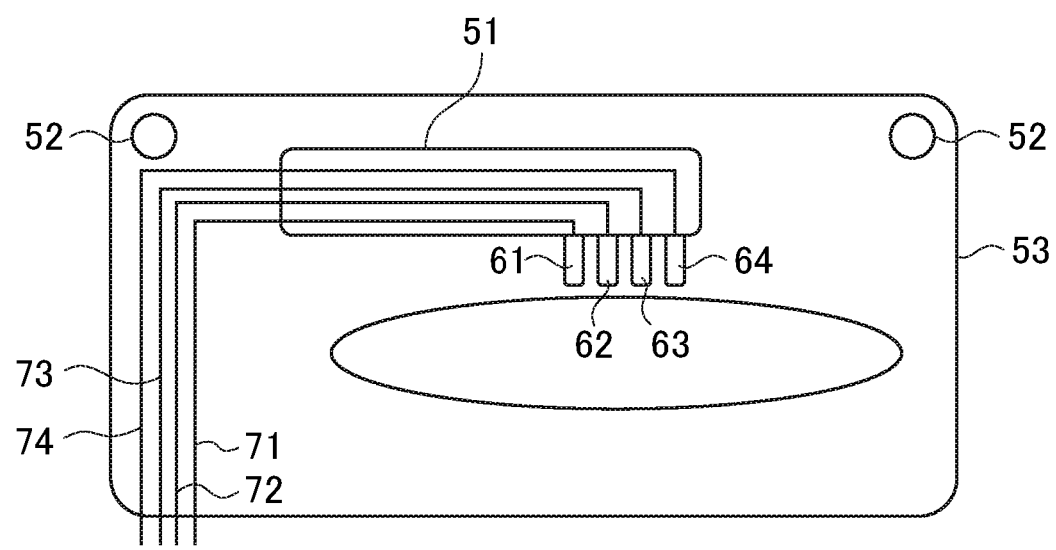
FIG. 9 is a view schematically showing a cleaning apparatus installed in the substrate processing apparatus and performing APM cleaning, sulfuric acid and hydrogen peroxide mixture (SPM) cleaning, and drying.

FIG. 9 is a view schematically showing a cleaning apparatus installed in the substrate processing apparatus and performing APM cleaning, SPM cleaning, and drying. The cleaning apparatus includes a chuck (not shown), an arm 51, cleaning tank cleaning showers 52, and a cleaning tank 53 accommodating the chuck, the arm, and the cleaning tank cleaning showers.

The chuck holds and rotates a circumference of a substrate to be cleaned.

The arm 51 can swing. In detail, the arm 51 is movable between a cleaning position at which a tip of the arm 51 is positioned above the substrate and a retraction position at which the tip of the arm 51 is distant from above the substrate. An APM supply nozzle 61, a pure water supply nozzle 62, an $H_2O_2$ supply nozzle 63, and an SPM supply nozzle 64 are installed downwardly beneath the tip of the arm 51. A pipe 71 of which one end is connected to an APM supply source (not shown) and the other end is connected to the APM supply nozzle 61 passes through an inner portion of the arm 51. Pipes 72 to 74 connected to the other supply nozzles also pass through the inner portion of the arm 51. Although a case in which the APM, and the like, are supplied from only above the substrate is shown in FIG. 9, the APM, and the like, maybe supplied from below the substrate by installing supply nozzles below the substrate.

The cleaning tank cleaning showers 52 are installed at an upper portion of the cleaning tank 53 at an inner side of the cleaning tank 53, and supply cleaning water (pure water, or the like) to the inner side of the cleaning tank 53 to clean the inner side of the cleaning tank 53. An openable and closable opening (not shown) for loading and unloading the substrate is installed in the cleaning tank 53.

FIGS. 10A to 10F are views sequentially showing processes of performing cleaning on a substrate by the cleaning apparatus of FIG. 9 (the pipes 71 to 74 are omitted in FIGS. 10A to 10F). Prior to processing in the present cleaning apparatus, the polishing of the substrate using the slurry including the cerium oxide is performed in the substrate processing apparatus, and preferably, the substrate is transported into the present cleaning apparatus without being dried, and is held by the chuck. The arm 51 positioned at the retraction position moves to the cleaning position.

Figure 10A:
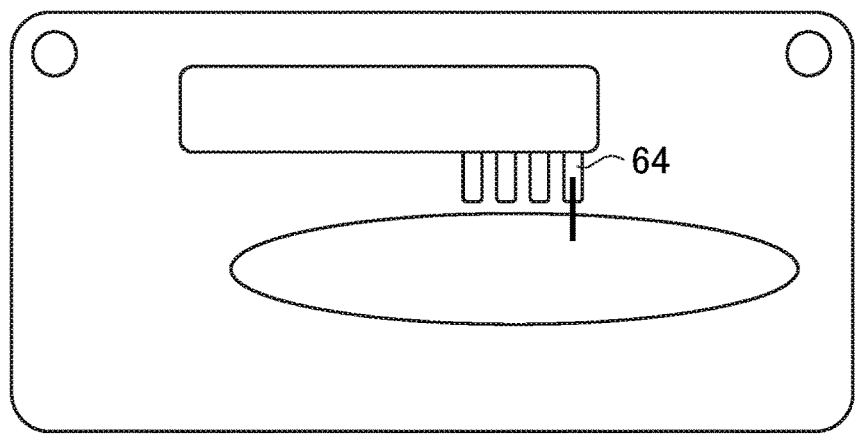
FIG. 10A is a view sequentially showing processes of performing cleaning on a substrate by the cleaning apparatus of FIG. 9.

First, as shown in FIG. 10A, the SPM is supplied from the SPM supply nozzle 64 to the substrate. Therefore, the slurry attached to the substrate and organic residuals generated at the time of polishing the substrate are removed (dissolved). In this case, the substrate may be heated by an external heat source. As described above, heat is supplied from the external heat source to the substrate, such that the residuals can be more reliably removed from the substrate.

Figure 10B:
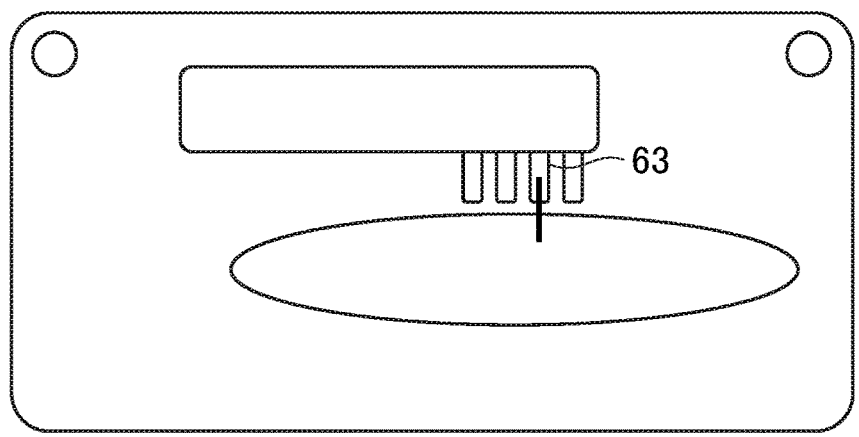
FIG. 10B is a view sequentially showing processes of performing cleaning on a substrate by the cleaning apparatus of FIG. 9.

Then, as shown in FIG. 10B, the hydrogen peroxide water is supplied from the $H_2O_2$ supply nozzle 63 to the substrate. Therefore, the sulfuric acid the SPM is removed from the substrate.

Figure 10C:
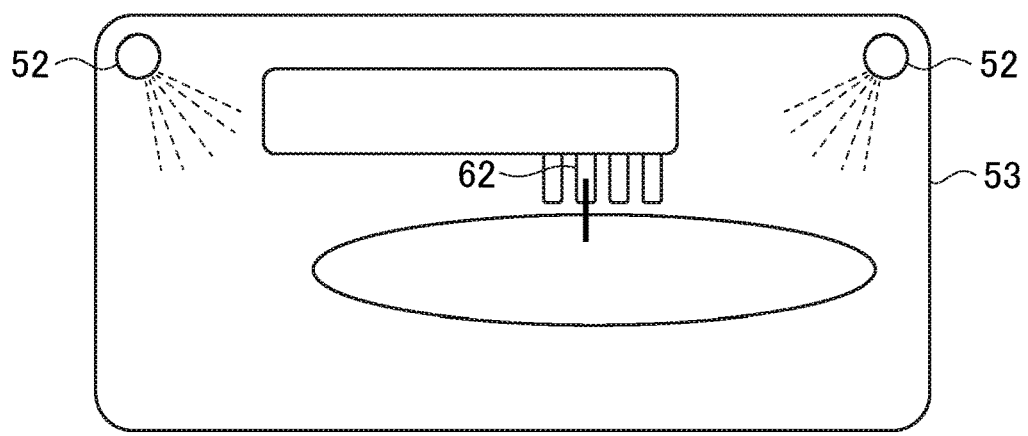
FIG. 10C is a view sequentially showing processes of performing cleaning on a substrate by the cleaning apparatus of FIG. 9.

Then, as shown in FIG. 10C, the pure water or warm water is supplied from the pure water supply nozzle 62 to the substrate. Therefore, the substrate is rinsed, such that a chemical liquid component is washed away. In this case, cleaning water is supplied from the cleaning tank cleaning shower 52 to an inner portion of the cleaning tank 53. Therefore, the SPM or the hydrogen peroxide water scattered in the cleaning tank 53 is also removed.

Figure 10D:
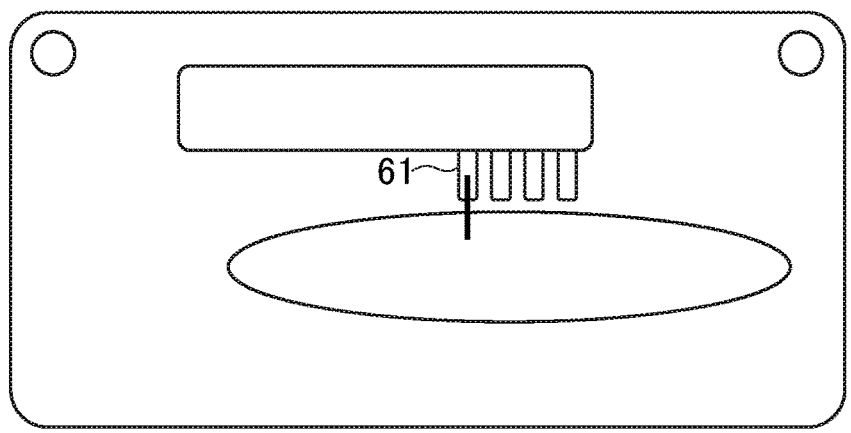
FIG. 10D is a view sequentially showing processes of performing cleaning on a substrate by the cleaning apparatus of FIG. 9.

Then, as shown in FIG. 10D the APM is supplied from the APM supply nozzle 61 to the substrate. Therefore, particles that could not be removed by the SPM cleaning are removed. In this case, it is preferable to use a mechanism capable of processing two fluids such as a liquid and a gas. In this case, the substrate may be heated by an external heat source. As described above, heat is supplied from the external heat source to the substrate, such that the residuals can be more reliably removed from the substrate. As shown in FIG. 10C, the inner portion of the cleaning tank 53 is cleaned, such that a reaction between the sulfuric acid in the SPM and the ammonia in the APM can be suppressed.

Figure 10E:
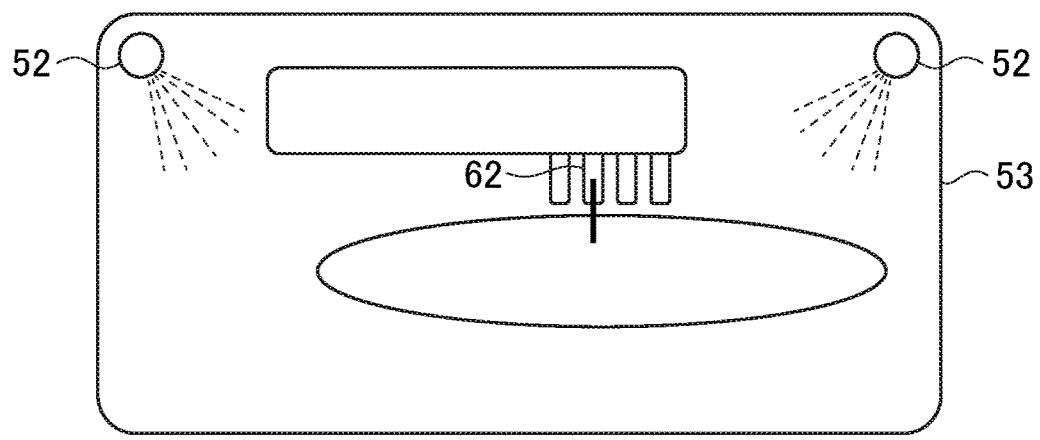
FIG. 10E is a view sequentially showing processes of performing cleaning on a substrate by the cleaning apparatus of FIG. 9.

Then, as shown in FIG. 10E, the pure water or warm water is supplied from the pure water supply nozzle 62 to the substrate. Therefore, the substrate is finally rinsed, such that the chemical liquid component is removed.

Figure 10F:
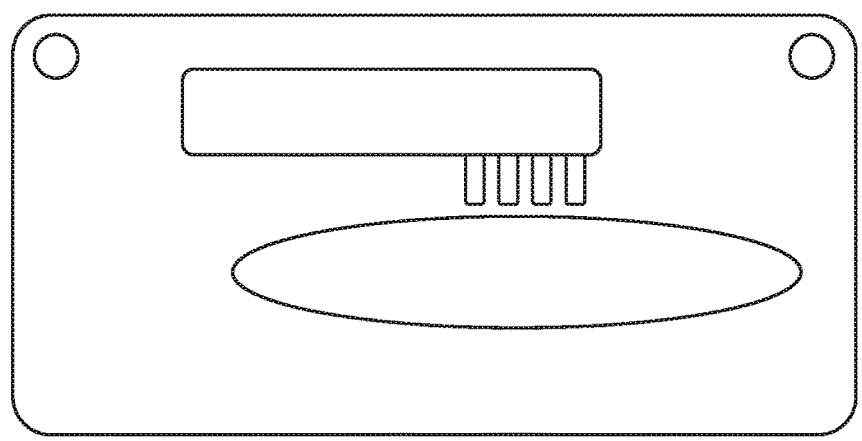
FIG. 10F is a view sequentially showing processes of performing cleaning on a substrate by the cleaning apparatus of FIG. 9.

Then, as shown in FIG. 10F, spin drying is performed on the substrate while rotating the substrate, and the dried substrate is then taken out from a housing.

Although an example in which the APM supply nozzle 61, the pure water supply nozzle 62, the $H_2O_2$ supply nozzle 63, and the SPM supply nozzle 64 are installed at the one arm 51 is shown in FIG. 9, an arrangement of the nozzles can be variously considered. For example, the pure water supply nozzle and the $H_2O_2$ supply nozzle may be supplied from fixed nozzles. In addition, the substrate may be roughly cleaned prior to the SPM cleaning shown in FIG. 10A. The rough cleaning may be, for example, APM cleaning or may be two-fluid jet cleaning supplying a jet stream of a gas and a liquid. Alternatively, the rough cleaning may be rollcleaning bringing a rotating roll sponge into contact with the substrate.

The embodiment described above is described in order for those skilled in the art to which the present invention pertains to practice the present invention. Various modifications of the embodiment described above can be made by those skilled in the art, and a technical idea of the present invention can be applied to other embodiments. Accordingly, the present invention is not limited to the embodiment described above, but should be interpreted as the broadest scope according to a technical idea defined by the claims. The Title is not to be taken as limiting in any way as the scope of the disclosed embodiments of the inventions.

What is claimed is:

1. A substrate processing apparatus, the apparatus comprising:
    a first cleaner configured to clean, using sulfuric acid and hydrogen peroxide water, a substrate polished by a polisher;
    a second cleaner configured to clean, using a basic chemical liquid and hydrogen peroxide water, the substrate cleaned by the first cleaner; and
    a drier configured to dry the substrate cleaned by the second cleaner.

2. The substrate processing apparatus according to claim 1, wherein the substrate processing apparatus does not have a mechanism configured to dry the substrate after being polished by the polisher and before being cleaned by the first cleaner.

3. The substrate processing apparatus according to claim 1, further comprising a transporter configured to transport the substrate polished by the polisher to the first cleaner without drying the substrate.

4. The substrate processing apparatus according to claim 3, further comprising a first liquid supply mechanism configured to shower liquid on the substrate that is being transported by the transporter.

5. The substrate processing apparatus according to claim 1, further comprising a substrate station on which the substrate after being polished by the polisher and before being cleaned by the first cleaner is mounted; and
    a second liquid supply mechanism configured to shower liquid on the substrate mounted on the substrate station.

6. The substrate processing apparatus according to claim 1, wherein
    the first cleaner is housed in a first housing provided with a first shutter that is openable and closable,
    the second cleaner is housed in a second housing provided with a second shutter that is openable and closable, and
    the drier is housed in a third housing provided with a third shutter that is openable and closable.

7. The substrate processing apparatus according to claim 1, further comprising a third cleaner configured to dean, using a basic chemical liquid and hydrogen peroxide water, the substrate polished by the polisher, wherein the first cleaner deans the substrate cleaned by the third cleaner.

8. The substrate processing apparatus according to claim 7, wherein the third cleaner cleans the substrate by bringing a cleaning member into contact with the substrate while supplying basic chemical liquid and hydrogen peroxide water to the substrate.

9. The substrate processing apparatus according to claim 1, wherein the second cleaner performs two-fluid jet cleaning after cleaning the substrate using the basic chemical liquid and the hydrogen peroxide water.

10. The substrate processing apparatus according to claim 1, wherein the polisher polishes the substrate using the polishing liquid including a cerium oxide.

11. A substrate processing method, the method comprising:
 providing a substrate processing apparatus, the substrate processing apparatus comprising a polisher, first cleaner, a second cleaner and a dryer;
 polishing a substrate using a polishing liquid by the polisher in the substrate processing apparatus;
 after that, cleaning the substrate using sulfuric acid and hydrogen peroxide water by the first cleaner;
 after that, cleaning the substrate using a basic chemical liquid and hydrogen peroxide water by the second cleaner; and
 after that, drying the substrate by the drier.

12. The substrate processing method according to claim 11, further comprising transporting the polished substrate from the polisher to the first cleaner without drying the polished substrate, after polishing the substrate.

13. A substrate processing method, the method comprising:
 in a first cleaning process, cleaning, using sulfuric acid and hydrogen peroxide water, a substrate to which cerium ions are attached;
 after that, in a second cleaning process, cleaning the substrate using a basic chemical liquid and hydrogen peroxide water; and
 after that, in a drying process, drying the substrate.

14. The substrate processing method according to claim 13, wherein in the first cleaning process, the substrate to which the cerium ions having a cerium concentration of $1.0 \times 10^{10}$ atms/cm$^2$ or more are attached is cleaned, and a cerium concentration of the substrate subjected to the drying process is a detection limit or less in measurement by an inductively coupled plasma mass spectrometry (ICP-MS) method.

15. The substrate processing method according to claim 13, wherein in the first cleaning process and/or the second cleaning process, the substrate is heated.

16. The substrate processing method according to claim 13, further comprising at least one of:
 supplying the basic chemical liquid and the hydrogen peroxide water to the substrate to which the cerium ions are attached;
 bringing a rotating sponge member into contact with the substrate to which the cerium ions are attached; and
 supplying a jet stream of a gas and a liquid to the substrate to which the cerium ions are attached, before the first cleaning process.

17. The substrate processing method according to claim 13, wherein the first cleaning process, the second cleaning process, and the drying process are performed in the cleaning tank, the method further comprising:
 cleaning an inner portion of a cleaning tank between the first cleaning process and the second cleaning process; and
 cleaning the inner portion of the cleaning tank between the second cleaning process and the drying process.

18. The substrate processing method according to claim 13, further comprising polishing the substrate using slurry including the cerium ions before the first cleaning process,
 wherein the substrate after being polished is not dried between the polishing process and the first cleaning process.

* * * * *